B. Boardman.

Dressing Metal Nuts.

Nº 76,983. Patented Apr. 21, 1868.

Witnesses:
Albert S. Bolles
Frank Douglas

Inventor:
Byron Boardman

United States Patent Office.

BYRON BOARDMAN, OF NORWICH, CONNECTICUT, ASSIGNOR TO HIMSELF AND FRANK DOUGLAS, OF SAME PLACE.

Letters Patent No. 76,983, dated April 21, 1868.

IMPROVEMENT IN DEVICE FOR TURNING NUTS.

The Schedule referred to in these Letters Patent and making part of the same.

TO ALL WHOM IT MAY CONCERN:

Be it known that I, BYRON BOARDMAN, of Norwich, county of New London, and State of Connecticut, have invented a new and improved Arbor for Turning Nuts; and I do hereby declare that the following is a full, clear, and exact description of the construction and operation of the same, reference being had to the annexed drawings, making a part of this specification, in which—

Figure 1:
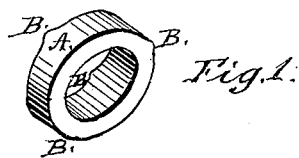
Figures 2, 3:
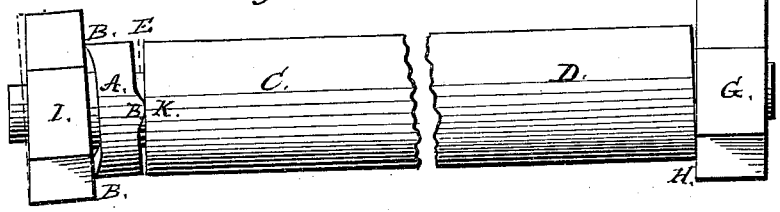
Figures 4, 5:

Figure 1 is a perspective view of the adjustable ring.
Figure 2 is a longitudinal view of improved arbor, with adjustable ring and nut on it.
Figure 3 is a longitudinal view of an ordinary arbor, with nut on it.
Figure 4 is a longitudinal view of improved arbor, without ring or nut on it.
Figure 5 is a longitudinal view of an ordinary arbor, without a nut on it.
Similar letters of reference indicate corresponding parts of all the figures.

The nature of my invention consists in providing a loose ring with two projections on each of its sides, at right angles with each other, and which is placed on the screw-arbor between its shoulder and the nut to be turned, where it adapts itself to the irregular shape of a rough or crooked nut, and makes the pressure directly endwise with the arbor, and perfectly true with the thread.

Adjustable ring A, fig. 1, is provided with rounded projections B B B B, two of which stand directly opposite each other on the same side, and directly at right angles to them on the other or opposite side of ring. Screw-arbor C, figs. 2 and 4, is made with a greater number of threads, to act as a bearing for the nut, and also made full size of outside of thread at the shoulder E, for greater strength of arbor. Arbor D, figs. 3 and 5, is the kind now in use, and has to be shouldered down below the bottom of the thread, at F, to allow nut G to screw up to its shoulder, and when the highest point of nut G strikes one side of shoulder, as at H, fig. 3, and is screwed up hard enough to turn or face up the nut, arbor D will spring at F, or the nut will cramp on the few remaining threads that hold it, so that it will be nearly as much out of true with the thread when faced up as before it was turned.

The operation of my improvement is as follows: Ring A is placed on arbor C, outside of which nut I is screwed on thread J, with a thread bearing the whole length of the nut; and when nut I strikes against projections B B of ring A, it tilts on projections B B, when in contact with the shoulder of the arbor at K, and thereby holds the nut firmly in direct line with the thread.

Claim.

What I claim, and desire to secure by Letters Patent, is—

1. The adjustable ring A, with projections B B B B, when used for the purpose specified.
2. The combination of arbor C with ring A, substantially as herein specified.

BYRON BOARDMAN.

Witnesses:
ALBERT S. BOLLES,
FRANK DOUGLAS.